United States Patent [19] [11] 4,437,392
Stouffer [45] * Mar. 20, 1984

[54] SWEEPING AIR STREAM APPARATUS AND METHOD

[75] Inventor: Ronald D. Stouffer, Silver Spring, Md.

[73] Assignee: Bowles Fluidics Corporation, Silver Spring, Md.

[*] Notice: The portion of the term of this patent subsequent to Feb. 17, 1998 has been disclaimed.

[21] Appl. No.: 220,068

[22] PCT Filed: Apr. 9, 1980

[86] PCT No.: PCT/US80/00368
§ 371 Date: Dec. 17, 1980
§ 102(e) Date: Dec. 15, 1980

[87] PCT Pub. No.: WO80/02262
PCT Pub. Date: Oct. 30, 1980

[51] Int. Cl.³ .............................................. B60H 1/24
[52] U.S. Cl. ....................................... 98/2.08; 98/2.09; 98/40 E; 98/40 N; 137/826; 239/389
[58] Field of Search .................. 98/2, 2.01, 2.04, 2.08, 98/2.09, 40 E, 40 N; 137/826, 829, 831; 239/102, 380, 381, 382, 389

[56] References Cited

U.S. PATENT DOCUMENTS

| 3,342,198 | 9/1967 | Groeber | 137/829 |
| 3,408,050 | 10/1968 | Jacobs | 239/102 X |
| 3,687,369 | 8/1972 | Johnstone | 239/102 |
| 3,832,939 | 9/1974 | Kakei et al. | 98/2.09 |
| 3,942,558 | 3/1976 | Honda et al. | 137/826 |
| 4,019,260 | 4/1977 | Levy et al. | 34/97 |

FOREIGN PATENT DOCUMENTS

| 543821 | 7/1957 | Canada | 239/382 |
| 54-68034 | 5/1979 | Japan | 98/40 E |
| 303092 | 6/1971 | U.S.S.R. | 239/102 |

OTHER PUBLICATIONS

R. E. Dennis, "Oscillating Aperture Card Ruffler-Air Operated", *TBM Technical Disclosure Bulletin*, vol. 11, No. 11, Apr. 1969, pp. 1493 and 1494.

Primary Examiner—Albert J. Makay
Assistant Examiner—Harold Joyce
Attorney, Agent, or Firm—Jim Zegeer

[57] ABSTRACT

In an automobile air flow system, air is forced through an air outlet element or nozzle (13, 21, 24) in a sweeping air stream pattern by an oscillating reed or vane member (42) supported solely at the downstream end (43) for air initiated oscillatory movement in the flow path of the air from the source; a weight (41) is on the free, upstream end of the vane and is of a size such that the rate of oscillation is determined by the spring constant of a spring in the vane member and the weight. The oscillating vane (42) is proportioned with respect to the cross-sectional size of the outlet such that at any extreme of its oscillatory movement it does not physically contact any other structural member.

22 Claims, 16 Drawing Figures

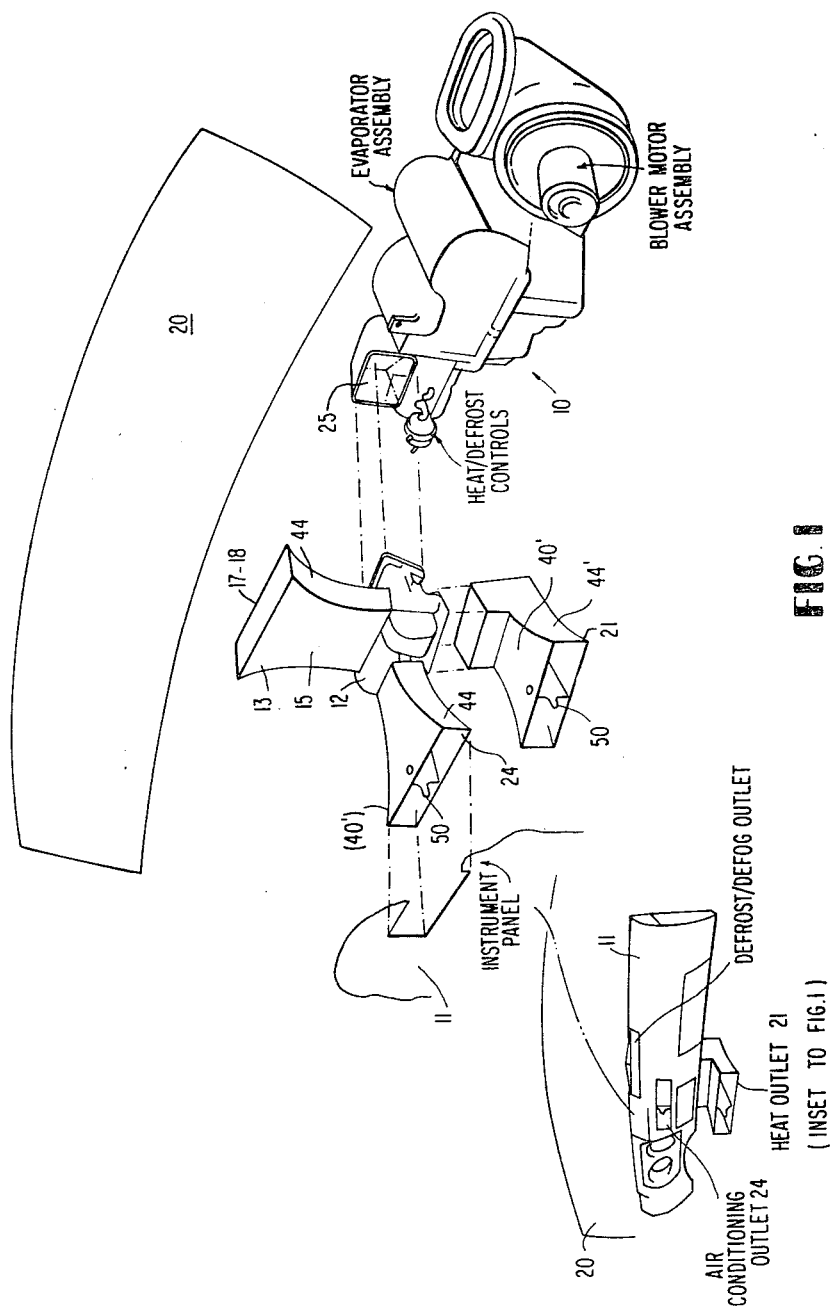

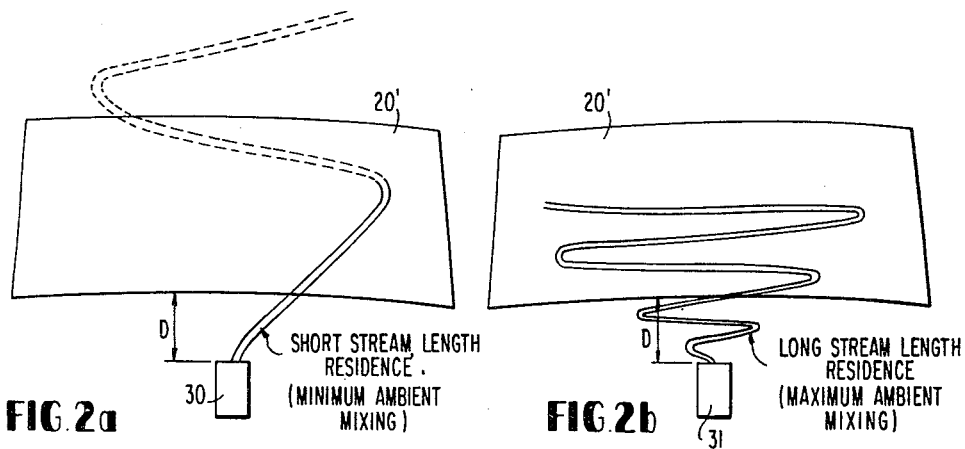
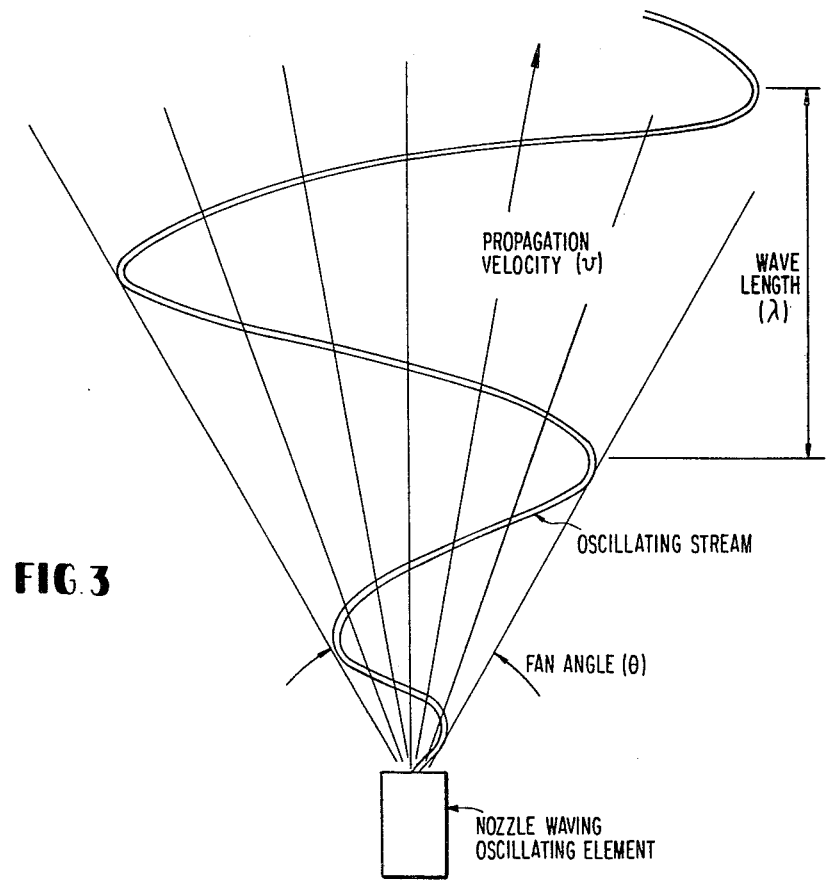

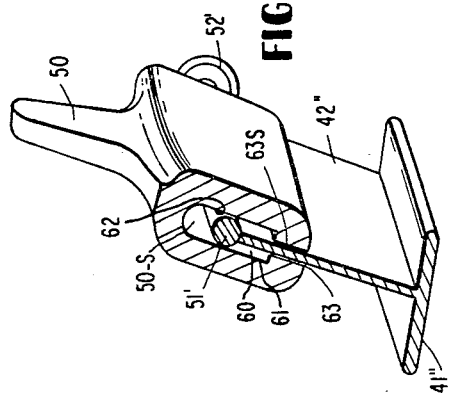
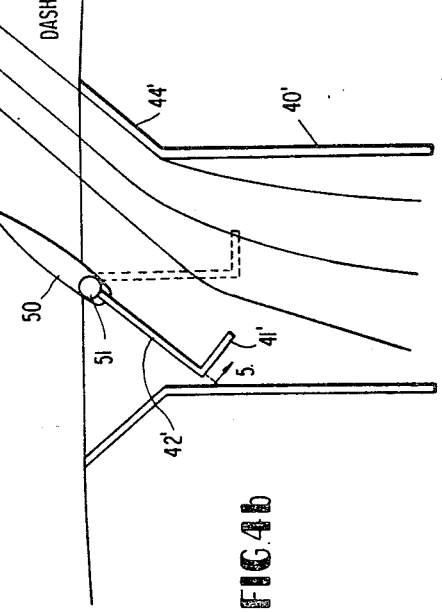
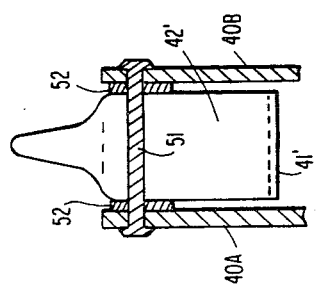
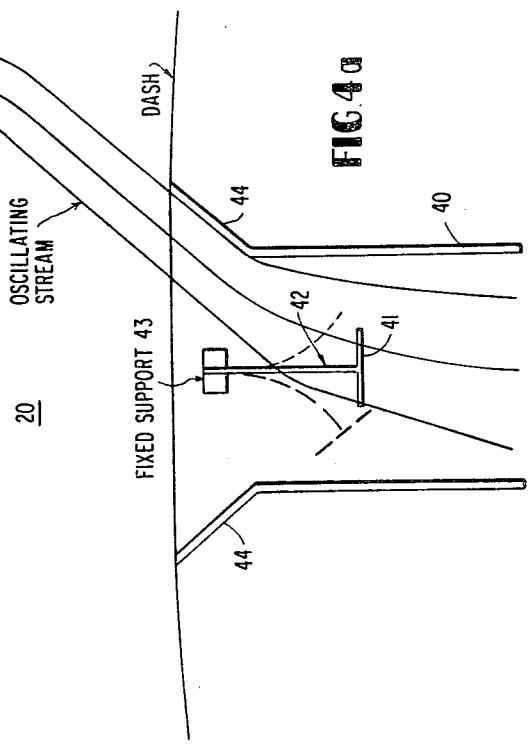

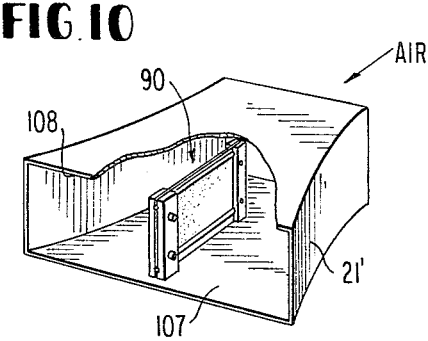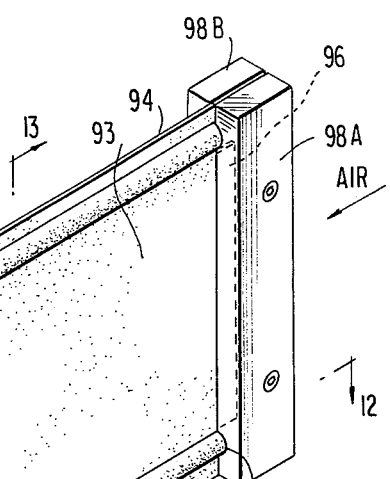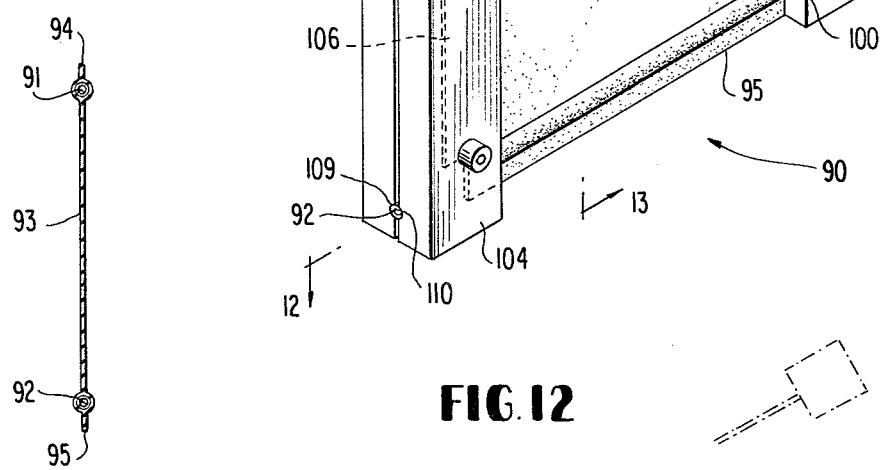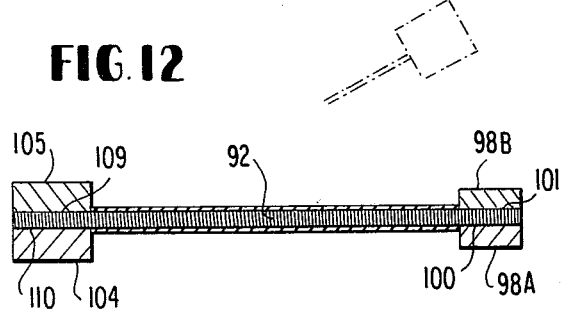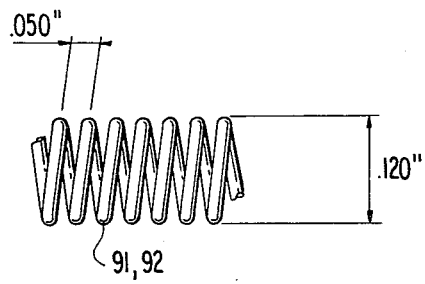

SWEEPING AIR STREAM APPARATUS AND METHOD

BACKGROUND AND BRIEF DESCRIPTION OF THE INVENTION

This application includes subject matter disclosed and claimed in my U.S. application Ser. No. 30,794 filed Apr. 17, 1979 and now issued as U.S. Pat. No. 4,250,799 on Feb. 17, 1981 and entitled "Sweeping Air Stream Apparatus and Method", and my U.S. application Ser. No. 119,699 filed Feb. 8, 1980 and issued as U.S. Pat. No. 4,336,909 on June 29, 1982 entitled "Oscillating Reed and Method".

The subject matter is also related to subject matter disclosed in my divisional application Ser. No. 302,285 filed Sept. 14, 1981 and entitled "Oscillating Reed and Method" and my divisional application Ser. No. 200,611 filed Oct. 24, 1980 entitled "Sweeping Air Stream Apparatus and Method" which is a division of my U.S. Pat. No. 4,250,799.

The invention generally is directed to air flow and distribution systems and in particular, to the treated air flow systems in automobiles such as defrosters, air conditioning and heating systems.

In automobile systems, the defrost system and the air conditioning system as well as the heating system typically are all contained under the dashboard and prior art efforts to use standard (feedback) type fluidic nozzles while, basically, functionally good in sweeping a jet of air across the windshield, physical size of the fluidic element in much too large to fit within the dash, particularly in small and downsized automobiles. For example, the outlet of some automobile ducting is about 3×5 inches. If one were to use the samller 3" dimension for the power nozzle width (W) of the fluidic element, the resultant length of the nozzle would be too long. Experiments with the resultant sweeping air jet from such a large element to discover more about its uniformity characteristics in the air showed that the frequency standard of the oscillator is in the order of 10 $H_z$ and at an air velocity of about 100 feet per second the characteristic wavelength is in the order of about 10 feet which is satisfactory. Various electrically powered oscillatory elements have been suggested, however they add cost, complexity and maintenance problems and are not silent.

The operational basis for the oscillating jet is that a concentrated jet would be uniformly swept over the windshield so that the intensity of the heat, because of minimal mixing with ambient, would be maximized at the point of impact of the air stream but would be uniformly distributed by the sweeping action. In order to accomplish this, the sweeping rate or frequency of the air stream must be low enough compared to the velocity of the air jets so that the wavelength is long compared to the nozzle. When the wavelength is long, a small portion of the stream resides in the ambient air before impacting the windshield. On the other hand, with a short wavelength much of the stream resides in the ambient air, producing severe mixing with the ambient, which for defrost purposes tends to defeat the purpose at hand. However, for air conditioning purposes, a low sweeping rate is desired in the initial cool down phase of the air confined within the automobile and, after the vehicle has been cooled down, a mixing with the ambient is desired so as to maintain the temperature. This dual sweep frequency concept is also desirable for the heating of the vehicle that is to say, the initial heating is obtained by a low rate or frequency of sweeping of the air stream in the passenger compartment in order to more rapidly cool down or heat up the passenger compartment and then, after a short time interval the sweep rate is increased to thereby produce mixing of the freshly cooled or heated air with the air in the passenger compartment.

In order to satisfy the requirement of small space and to minimize ambient mixing for defrost operation (which is undesirable since it lowers the thermal energy of air impacting the windshield), the present invention provides an oscillator whose frequency is independent of the air stream properties and whose frequency is characteristically low. However, the invention also provides an oscillator whose frequency can be changed dependent upon time and/or temperature to achieve an initial low frequency of operation so as to assure a rapid heating and/or cooling of the passenger compartment and subsequently, a higher frequency of oscillation to assure a better mixing characteristic (in contrast to the defrost operation) after the passenger compartment has been cooled or heated for a selected period of time.

The present invention provides a vibrating reed air stream oscillator, constituted by a thin resilient vane in the shape of an inverted "T" which is supported in cantilevered fashion from the stem of the "T" in the duct. This provides an air initiated oscillation mechanism which is extremely reliable, very low in cost and can be installed or incorporated in existing defrost systems without significant structural modification and which does not require any additional space. In fact, the invention can reduce the space requirements since it results in a much more efficient and rapid defrost of an automobile windshield by concentrating the heated air rather than diffusing it over a wide or long path. That is to say, instead of a diffuser of wide angles, the air stream is swept over the wide angle and, in some cases, a single defrost air outlet adjacent to the windshield can accommodate the entire windshield.

The oscillating element of the present invention solves the problems in a simple, efficient relatively maintenance free and inexpensive manner.

According to the invention an oscillatory member is supported in the air outlet element of an automobile air flow system, said oscillatory member being constituted by a resilient vane or reed secured at its downstream end proximate the center of the air outlet element, the free upstream end has a weighted, air impingement surface and is proportioned with respect to the cross-sectional size of the outlet element that during oscillatory movement there is no physical contact with any structural portion of the outlet elements. In defrost-/defog systems, the frequency of oscillation is such that the wavelength is long relative to the distance from the outlet element to the windshield surface thereby minimizing mixing of defrost/defog air with ambient air. In heating and air conditioning systems higher initial frequencies, and hence shorter wavelength, are desireable to obtain better mixing to obviate hot or cold spots. Rapid heating/cooling of the passenger compartment, initially requires subsequently lower frequency-longer wavelength.

The vane is fairly broad and wide and acts like a moving wall to deflect or direct the exiting air jet stream in a sweeping fashion. Since the reed or vane is wide and its upstream end unsupported and during its travel in any direction it must not contact any structure, the fluid air stream can and do at times distort the bending axis of the reed and thereby creating a clicking. However, such noise making is very undesirable particularly in the closed space of an automobile and, because of the distortion in the spring metal itself, tends to greatly reduce the life of the element when used as an oscillator. A further feature of the present invention provides improved oscillating reed structures which are essentially clickless or noiseless and have long operating lifes.

In a first embodiment this is achieved by providing a transverse stiffening of the reed element in directions transverse to the direction of air flow so as to limit bending of the reed element during its oscillations along an axis which is transverse to the direction of air flow. That is to say, the axis of stiffening is parallel to the bending axis but it does not detract from the flexibility and oscillating function of the device. In a preferred embodiment, the bending is a gentle curvature of bending of the reed element over substantially the entire body. In addition, the body of the reed support element has a slot in it with the mouth of the slot gently rounded or smoothed to receive and clamp the downstream end of the reed element so that there are no sharp edges against which the body of the reed element is engaged during oscillation. Moreover the edges of the reed element is polished to remove notches etc. . . . all of these features avoiding metal fatigue of the reed body leading to extended life of the oscillator element per se.

In a further embodiment, the oscillating vane is constituted by a pair of spaced coil springs with an elastomeric sheet between them and a weight. This flexible assembly is inherently clickless and the stress in the coil spring is very low even for large flexural deflections so that fatigue is no problem. Apart from the requirement that there be no physical contact with sidewalls etc. . . . handling of the materials or precise tolerance is required.

BRIEF DESCRIPTION OF THE DRAWINGS

The above and other objectives, advantages and features of the invention will become more apparent from the following specification when considered in conjunction with the accompanying drawings wherein:

FIG. 1 (and inset thereto) is an isometric perspective view of an automobile defrost system and its proximity to the windshield of an automobile to which the invention has been applied;

FIG. 2a illustrates the sweeping rate (frequency) of the air stream must be low enough compared to the velocity of the jet so that the wavelength is long compared to the nozzle to windshield distance. FIG. 2b shows that when the wavelength is long, a small portion of the stream resides in the ambient air before impacting the windshield.

FIG. 3 illustrates the relationship between the air stream wavelength, the velocity of propagation and the frequency of oscillation, FIG. 4a illustrates a fixed oscillation element primarily for defrost/defog use and FIG. 4b illustrates a manually adjustable oscillatory element flwo director both figures being according to preferred embodiments of this invention;

FIG. 5 is modification of the oscillatory element shown in FIG. 4b to which an oscillatory rate control function has been applied for controlling the rate of oscillation of the oscillating element, FIG. 6 is a detailed cross-sectional view of the friction held manual control arrangement of FIG. 4b.

FIG. 10 is a partial isometric view of an automobile heat/air conditioning nozzle incorporating a coil spring-elastomeric vane modification of the oscillating vane of the present invention, FIG. 11 is an isometric view of the coil spring-elastomeric vane shown in FIG. 10, FIG. 12 is a cross-sectional view along lines 12—12 of FIG. 11, FIG. 13 is a cross-sectional view along lines 13—13 of FIG. 11 and, FIG. 14 is an enlarged side elevational view of a typical coil spring and its dimensions.

DETAILED DESCRIPTION OF THE INVENTION

Figure 7:
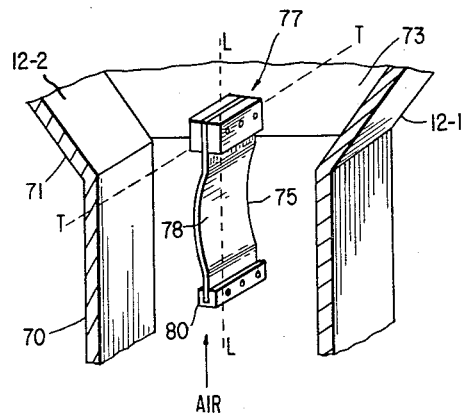
FIG. 7 is a partial isometric perspective view of an automobile defrost nozzle incorporating the invention.

The invention will be described with particular reference to that automobile air flow system.

As shown in the embodiment illustrated in FIG. 1, a windshield defrost system according to the invention includes a conventional heater 10 which is usually installed underneath the dashboard or instrument panel 11 connected, via main duct work 12 to defrost/defog nozzle 13. The nozzle 13 is connected via duct 15 to main ductwork 12 but, it will be appreciated that separate passage ways or ducting may be utilized for connecting outlet nozzles to car heater 10 in the event two nozzles are used. Nozzle 13 has an outlet opening 17, juxtaposed so as to direct air over the inner surface of windshield 20.

Air for heating the interior of the passenger compartment is delivered through separate nozzle 21 for directing air from common duct 12 to the interior compartment of the vehicle. It will be appreciated that control linkages and/or cables for controlling valving in duct 12 for directing all the air to outlet nozzle 13 for defrost purposed, and/or to the outlet nozzle 21 for heating the interior compartment of the vehicle are standard control instrumentalities and hence do not per se form a part of the present invention. By the same token, in some automobiles the outlet air nozzle 21 can be connected to a source of outside air for venting purposes.

Still referring to FIG. 1, there is shown air conditioning outlet nozzle 24 which is connected to a conventional automobile air conditioning unit and air circulation system 25, it being appreciated that outlet 21 can also be used for supplying air from the air conditioning unit to the passenger compartment. The heat/defrost door or valve assembly and motor, the air conditioner evaporator case and assembly as well as the blower motor and an intake are conventional and not illustrated in detail.

Most fluidic nozzles have a characteristic wavelength $\lambda$ which is a constant for a given size nozzle, constant over a variety of pressures and has a frequency characteristic which is linear with velocity. The wavelength is a function of the velocity of propagation and the frequency of oscillation so that $$\lambda = (V/F)$$

wherein:
$\lambda$ equals the wavelength of the oscillating stream,
V equals velocity of stream propagation and
F equals the frequency of oscillation.

FIG. 2a and 2b illustrate the patterns on an automobile windshield 20' of the operational basis for oscillating the air jet such that a concentrated jet is uniformly swept over the windshield 20' so that the intensity of the heat, because of minimal mixing of heated air with the ambient air, will be maximized at the point of impact of the air stream on the windshield and this effect is uniformly distributed by the sweeping action over the windshield surface. The relationship of the sweeping rate (frequency) of the air stream issuing from nozzle 30 (FIG. 3a) and the nozzle 31 (FIG. 2b) respectively to windshield distance D is illustrated in FIGS. 3a and 3b. When the wavelength is long relative to distance D, a small portion of the stream resides in the ambient air just before impacting the windshield. This is illustrated in FIG. 3a and labled short stream length residence (minimum ambient mixing). When the wavelength is short relative to distance D, a much larger portion of the air stream resides in the ambient air before impacting the windshield; this is illustrated in FIG. 2b and legended "long stream length residence (maximum ambient mixing)". For the defrost operation, the operation illustrated in FIG. 3a is used.

As discussed earlier in connection with the improvements in efficiency in the cooling and heating of the passenger compartment, after the initial heating or cooling of the passenger compartment has taken place it is desirable that maximum ambient mixing condition be brought into play. However, the short stream length residence for minimum ambient mixing is desirable in the heating and cooling situation in the initial heating or cooling cycle of the passenger compartment. Reference is made to FIG. 5 which discloses the control over the oscillating element to achieve a situation shown in FIG. 2a and FIG. 2b.

THE OSCILLATOR ELEMENT OF THIS INVENTION

Referring now to FIG. 4a, the duct or channel 40 carrying air under pressure from the blower in the defrost unit 10 is directed to an oscillatory impingement member or element 41. Oscillatory impingement element 41 is supported for oscillatory movements by a thin metal reed 42, which together with the oscillatory "T" which is cantileverly supported from the stem of the "T" at a fixed support 43.

Air passing through duct 40 will impinge on the cross part of the "T" shaped element and initiate oscillation thereof. The spring 42 (which is the stem part of the "T" reed) and the mass (the cross part of oscillatory impingement member 41) act together as a spring-mass system which is forced to oscillate by the air flowing by it. The stem 42 of the "T" reed acts like a moving wall to deflect the exiting air stream in an oscillatory, sweeping manner across windshield 20.

The frequency is constant for any air velocity since it is determined primarily by the spring-mass characteristics of the "T" system. Therefore, it is easy to select parameters to produce a low frequency (say about 4 hertz $H_z$) so that the oscillating air streams wavelength is $$= V/F = (100 \text{ feet per second})/4 \text{ hertz} = 25 \text{ feet}$$

Furthermore, the overall length of the device can be made very short so that under the dash space is conserved and may even be reduced. No additional or special requirements are needed for the power source or feed ducting as it operates over extremely wide range of air flows.

The same vibrating reed system can be used to cause the sweeping motion of the air stream entering an automobile passenger compartment for the purpose of more efficiently conditioning the air. Thus, as described earlier herein, the air stream can initially have a long wavelength, the oscillatory frequency of vibrating reed oscillatory impingement member 41'-42' being low, so that the short stream length provides good throw to more efficiently heat up space remote from the outlet nozzle and, after a period of time changed to a shorter wavelength to provide greater mixing with the ambient air (see FIG. 2b). In FIG. 4b the oscillating element has the shape of an "L" with the stem 42' being a thin metal reed and the cross or let 41' of the "L" being impinged upon by the air flow in passage way 40'.

There are times when it is desirable in the heating and cooling application that the air stream be confined to a particular location in the passenger compartment, such as to the driver's side. As described above, the oscillatory impingement member can be captured at a selected position in the outlet nozzle element to prevent oscillation thereof and to cause air to issue from the outlet in a non-sweeping air stream pattern.

As shown in FIG. 4b and FIG. 6 the air oscillating element is mounted on a lever 50 which projects a short distance beyond the end of the nozzle so as to be accessable to the passenger compartment to serve as a flow controller and also as a pointer or indication of the direction of air flow. Flow director lever 50 is mounted on a pivot pin 51 extending between walls 40-A and 40-B of air passageway 41 and one or more friction elements or washers 52 friction elements 52, which may be integrally formed on the walls 40-A and 40-B, serve to retain lever 50 and the oscillatory member 41'-42' at any passenger selected position in the air stream. In the position illustrated in full lines in FIG. 40 the air stream is deflected or directed to flow, to the right and is not oscillated or swept. When lever 50 is centered and substantially aligned with the air passageway 40', oscillatory element 41'-42' is set into oscillation by the air flow through the passageway thereby imparting a sweeping movement to the air stream. Since the cross member 41' is more on one side of the passageway, more air will be directed to the opposite side and therefore can serve as a means to favor the distribution of air in the passenger compartment to the driver's side, if desired.

The oscillatory rate change feature is illustrated in FIG. 6. According to this feature the length of the reed element 42 is adjusted to adjust the rate of oscillation. Flow director lever 50 is provided with an elongated slot 60 which has side walls 61 and 62 which frictionally engage pivot 51' to which the stem 42" of the oscillating element is secured (it being appreciated that the pivot may be integrally formed on the end of the stem). The stem 42' passes through a slit 63 in the end of lever 51. The surfaces 63S of slit 63 slidingly engage the surfaces of the stem 42" to thereby lengthen or shorten the length of the spring and hence lower and raise the oscillatory frequency by pulling lever 51' out or pushing it in, respectively. Friction washer or elements 52 also serve to maintain the adjusted position of lever 51' with respect to stem 42".

Figure 8:
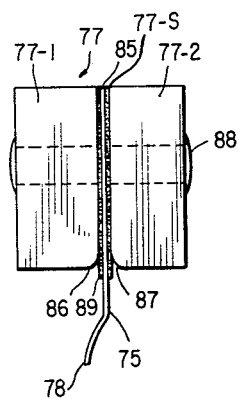
FIG. 8 is an enlarged side perspective view of the mounting bar for securing the downstream end of the vibrating reed and FIG. 9 is an isometric perspective view of the oscillating reed of the present invention showing the weight attachment and the bend therein.

Referring to FIG. 7 the duct or channel 70 of an automobile windshield defrost system is illustrated and it is connected to a source of defrost air for defrost operation. As noted above the invention can be applied to other air supply systems such as heating and cooling systems for automobiles and can be beneficially applied with equal facility to air supply systems where it is desired to sweep the air back and forth as for example, from a room air conditioner. The outlet nozzle 71 has a pair of spaced flaring walls 72-1 and 72-2 respectively joined by a pair of side walls 73, one of which is shown in FIG. 7. A vibrating reed oscillator element 75, described in greater detail in connection with FIG. 9, has the downstream thereof 76 secured in a mounting bar assembly 77 (described more fully in connection with FIG. 8), mounting bar 77 being secured to side walls 73. A curvature 78 or bend is provided in the body of the reed element 75 which stiffens the body of the element so that it generally flexes about an axis transverse to the direction of air flow and in this embodiment the air flow axis is denoted generally by the line "T". Any bending movement of the reed element 75 about any nonparallel axis such as its longitudinal axis 1, is prevented by the bend 78.

It will be appreciated that a series of transverse corrugations along the entire length of the body element 75 can achieve the same objective as the gentle curvature or bend 78, as well as a series of stiffener elements spaced along the entire operating length of the body 75 and spaced relatively short distances from one another can achieve the same objective which is to prevent cross or twist bending of the body of the reed element 75 and to limit the bending about the axis "T" or any axis parallel thereto.

Figure 9:
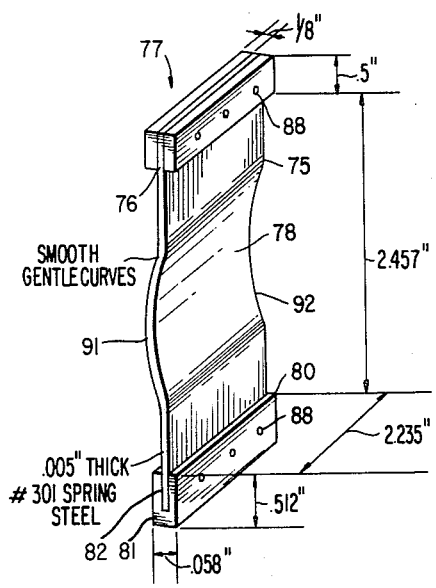

The upstream end 80 has a weight 21 riveted thereto, the weight 81 having a slot 82 therein into which the upstream end 80 of vibrating reed element 75 is received and riveted therein or otherwise secured. As shown in FIG. 9, in the preferred embodiment the reed element is constituted by spring steel. In an operating example, the spring steel was a number 301 spring steel fully hardened, but it will be appreciated that most degrees of hardness of spring steel can be utilized to practice the invention. Fully hardened spring steel has a tensil strength of approximately 175,000 psi minimum and the extra hard spring steel 301 has a tensil strength of over 200,000 psi, both of which are useful in practicing the invention. Also, the weight 81 was 14 grams, having a width of 0.058 inches a thickness of 0.512 inches, and a width the same as the width of the reed element 75, namely 2.235 inches. The reed itself has a thickness of 0.005 inches. The bend 78 in the preferred embodiment was formed by rolling the body of the reed element 75 over a ⅛ inch cylinder. In the illustrated embodiment, the bend 78 has a radious of about 3 inches but this is not critical. What is important though is the twisting movements of the reed element be resisted so as to avoid bending of the body of the reed element about an axis other than those which are parallel to a secured downstream end 76 of reed element 75.

As is conventional in the manufacture of springs, the edges 91 and 92 of the reed element are polished to eliminate notches burrs and the like and the downstream end 76 of the element is secured in mounting bar assembly 77. Mounting assembly 77 is constituted by a pair of plates 77-1 and 77-2 which has a slot 85 or space therebetween, the opposing edges or corners 86 and 87 of the slot being rounded (a radius of at least ⅛ inch) so that there are no sharp edges against which the body of the reed element bears during the back and forth oscillatory movement. Thin rubber shims 77-S are positioned on each side of reed element 75 to serve as cushions. Rivets 88 are used to secure the end 76 of the reed element 75 in the mounting bar assembly 77 and the mounting bar assembly 77 is secured by screws, welding or releasable fasteners in the sidewalls 73 (only one shown) of the outlet element. The mounting bar can also be formed of plastic material, if desired.

With reference to FIG. 9, for use in sweeping the defrost air of a Pinto automobile (manufactured by the Ford Motor Company) a typical reed element was made of fully hardened 301 spring steel (175,000 psi) having a thickness of 0.005 inches a width of 2.235 inches and a length between the upper edge of the weight 81 and the lower edge of mounting bar assembly 77 of 2.457 inches. The weight 81 had the dimensions and weight given above.

It will be appreciated that since the inverted "T" e.g., the oscillatory impingement element, is only required to oscillate at relatively low rates, the movement is limited thereby minimizing the material problem. And in view of the relative simplicity of and compactness of the device, it can reduce the space under the dash. Since in the preferred embodiment of the invention, the cross-sectional area of the oscillatory impingement element is smaller than the cross-sectional area of the duct to permit free movement thereof without impacting on any element, it is completely silent, consumes no power and does not introduce any significant pneumatic impedance and thereby does not unduly load the impeller or blower motor in the defrost unit.

Referring to FIG. 10, the duct or channel of an automobile heater/air conditioning system is indicated as supplying air to a nozzle 21' which incorporates a further modified form of oscillating vane constituted by the coil spring-elastomeric vane assembly 90, the details of which are illustrated in FIGS. 11-14. In this embodiment, a pair of spaced coil springs 91 and 92 (the dimensional parameters are shown in FIG. 14 for a typical application), which are embedded in tubular end sections 93 and 94 of a thin seet 95 of elastic or elastomeric material, such as rubber. The upstream end of tab 96 of elastic vane 95 is clamped between a pair of weight elements 98A and 98B, which have a pair of semi-circular recesses 100 and 101 in their facing edges for receiving and clamping the upstream or oscillating end of coil springs 91 and 92. The downstream end or tab 102 of elastic vane 95 is secured between a pair of mounting bars 104-105 which are used to secure the downstream end 106 of the vane assembly to the spaced walls 107-108 of nozzle 21'. Mounting bars 104-105 also have a pair of facing semicircular recesses 109-110 for receiving and clamping the downstream ends of the coil springs 91 and 92.

The tubular ends 93 and 94 are formed by folding back a pair of integral flaps and cementing or by fusion, molding etc . . . Although in the example the elastomeric sheet is mounted to the coil springs 91 and 92 by the tubular end sections, integral upstream tab portions or extensions 96 clamped between weight elements 98A and 98B and the integral downstream tab extension 102 clamped between the mounting bar assembly coact with the tubular sections to stabilize the assembly to prevent sagging under gravity or acceleration in the plane of the assembly shown in FIG. 10. This flexible assembly is silent and inherently clickless. The stress in the coil springs 91 and 92 is very low, even for large flexural deflection, so that fatigue is not a significant problem. Moreover, no special handling or treatment of the materials or precise tolerance are required. Also, this assembly can be used in the defrost nozzle.

It will be appreciated that all rubber or elastomeric material vane-springs may be molded or otherwise formed to have the desired spring-mass characteristics described above and perform in air flow systems as described above, due regard being had for the effect of temperature on rubber etc. Likewise, the composite metal-elastometer and spring properties may easily be utilized to practice the invention. The mass or weight required to achieve a desired spring-mass system can be molded into the end of the vane, and the mounting assembly can also be integrally molded into the unit.

While I have shown and described preferred embodiments of my invention, it will be appreciated that various modifications and adaptations of my invention are possible and it is intended that such modifications and changes as would be obvious to those skilled in the art be emcompassed within the spirit and scope of the claims appended hereto.

I claim:

1. In an air flow system having a source of air under pressure flowing through a channel coupled to an outlet element and the air is issued to the ambient environment in a sweeping air stream pattern, the improvement comprising an air powered oscillatory member, said oscillatory member being a vane having a longitudinal axis normally aligned with the direction of air flow through said channel, and means securing the downstream end only of said oscillatory member in fixed relation to said outlet element with the upstream end of said oscillatory member being free and oscillatable, solely by air flow, between a pair of extreme positions to each side of said longitudinal axis, said extreme positions being short of contacting said outlet and said channel and causing the air to issue in a sweeping air stream pattern from said outlet element.

2. The invention defined in claim 1 including a weight secured to the free end of said vane.

3. The invention defined in claim 1 wherein said oscillatory member is a bendable resilient vane and includes means for limiting the bending thereof to an axis transverse to the direction of air flow.

4. The invention defined in claim 3 wherein said means for limiting the bending of said resilient vane is constituted by a bend in the body of said resilient vane member.

5. The invention defined in claim 3 wherein said means securing said downstream end of said vane element includes a mounting assembly bar having a slot formed therein for receiving said downstream end of said resilient vane, said slot having the opposing facing corner edged thereof at the entranceway to said slot rounded and smoothed.

6. The invention defined in claim 3 wherein the edges of said resilient vane body member is polished to lengthen the life of said oscillator element.

7. The invention defined in claim 2 wherein the end of said weight presents a flat surface transverse to the direction of air flow in said channel.

8. The invention defined in claim 1 wherein said vane is resilient and is constituted by a pair of spaced apart coil springs and a flexible sheet extending between and carried by said coil springs, respectively, and a weight member carried at the free end of said resilient vane.

9. The invention defined in claim 8 wherein said flexible sheet is made of an elastomeric material, a pair of tubes formed at each side of said flexible sheet, and one of said coil springs being located in one of said tubes, respectively.

10. The invention defined in claim 9 wherein said flexible sheet includes upstream and downstream tab extensions, said weight member being secured to the upstream tab extension and upstream ends of said springs, and means securing said downstream tab extension and the downstream ends of said springs together and to said mounting means.

11. In an automobile air flow system wherein a source of air under pressure is forced through a channel to an outlet element and issued therefrom in a sweeping air stream pattern, the improvement and means for causing the sweeping of said air stream comprising, an oscillatory member as defined in claim 1, means supporting said oscillatory member proximate the center of said outlet element, said oscillatory member being proportioned with respect to the cross-sectional size of said outlet element such that at any extreme of its oscillatory movement in said outlet element it does not physically contact any structural portion of said channel and said outlet element, said oscillatory member being rendered oscillatory solely upon the flow of air from said source through said outlet and causing the air flow to sweep back and forth in said outlet element, said oscillatory member including a spring, and means securing said spring at the downstream end to at least one surface of said outlet element.

12. The invention defined in claim 11 including means to capture said air powered oscillatory member at a selected position in said outlet element to prevent oscillation thereof and cause air to issue from said outlet in a non-sweeping air stream pattern.

13. The invention defined in claim 12 wherein said means to capture said oscillatory member includes a friction stop, and lever means for adjusting said member to a non-oscillatory position.

14. The invention defined in claim 11 including an impingement member on the free end of said spring and wherein the rate of oscillation of said impingement member is related to the spring constant of said spring, the rate of air flow, and the weight of said impingement member.

15. The invention defined in claim 11 wherein said air powered oscillatory member is in the shape of an inverted "T", the free end of the stem of said "T" being the sole point of support for said "T" in the air flow, and being downstream of the cross of said "T".

16. The invention defined in claim 11 wherein said air powered oscillatory member is in the shape of an inverted "L", the free end of the stem of said "L" being the sole point of support for said "L" in the air flow and being downstream of the cross of said "L".

17. The invention defined in claim 11 wherein said oscillatory member includes means for limiting the bending thereof to an axis transverse to the direction of air flow in said channel.

18. The invention defined in claim 17 including a weight member on the upstream end of said spring wherein the rate of oscillation of said oscillatory member is related to the spring constant of said spring, the rate of air flow and the weight of said weight member.

19. The invention defined in claim 11 wherein said spring in said oscillatory member is constituted by a pair of spaced steel coil springs, a flexible sheet extending between and supported by said spaced apart coil springs, and a weight member at the upstream end of said oscillatory member.

20. The invention defined in claim 19 wherein said coil spring pair is embedded in the ends of said flexible sheet.

21. The invention defined in claim 20 wherein said flexible sheet is elastic.

22. The invention defined in claim 20 wherein said flexible sheet is rubber.

* * * * *